United States Patent
Hori et al.

(10) Patent No.: US 7,197,365 B2
(45) Date of Patent: Mar. 27, 2007

(54) CONTROLLER, PROGRAM PRODUCT, AND STORAGE MEDIUM

(75) Inventors: Yoshihiro Hori, Gifu (JP); Kazuya Ogawa, Mizuho (JP); Etsuko Sugimoto, Tokyo (JP); Hiroshi Takemura, Aichi (JP); Yoshinori Hatayama, Komaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 3 days.

(21) Appl. No.: 11/042,186

(22) Filed: Jan. 26, 2005

(65) Prior Publication Data
US 2005/0197989 A1   Sep. 8, 2005

(30) Foreign Application Priority Data
Feb. 13, 2004  (JP)  .............. 2004-036434

(51) Int. Cl.
G05B 11/01  (2006.01)
G05B 19/42  (2006.01)
G05B 13/02  (2006.01)

(52) U.S. Cl. ............... 700/19; 700/20; 700/48; 700/49; 700/87; 706/20; 706/47; 706/61; 709/223; 709/224; 709/226; 707/3; 707/100; 707/200

(58) Field of Classification Search ........... 706/20, 706/47, 61; 700/48, 49, 19, 20, 86, 87; 707/3, 707/100, 200; 715/800; 709/223, 224, 225, 709/226
See application file for complete search history.

(56) References Cited

U.S. PATENT DOCUMENTS

| | | | |
|---|---|---|---|
| 6,278,993 B1 * | 8/2001 | Kumar et al. | 707/3 |
| 6,336,117 B1 * | 1/2002 | Massarani | 707/100 |
| 6,924,828 B1 * | 8/2005 | Hirsch | 715/800 |
| 2005/0044225 A1 * | 2/2005 | Ota et al. | 709/225 |
| 2005/0125694 A1 * | 6/2005 | Fakes et al. | 713/201 |

FOREIGN PATENT DOCUMENTS

JP     10-276478 A     10/1998

* cited by examiner

Primary Examiner—Ramesh Patel
(74) Attorney, Agent, or Firm—McDermott Will & Emery LLP (57) ABSTRACT

An object of the present invention is to realize an in-home network system that is capable of smoothly controlling an appliance even when a new kind of appliance that has not been obtained conventionally is connected to an in-home network or even when an unusual, special use form is set in a network. A controller of the present invention compares a device type of an appliance connected to an in-home network with a skeleton stored in a skeleton DB. When a skeleton rule in accordance with the appliance type is not stored in the skeleton DB, a request for acquisition of the skeleton rule of the appliance is transmitted to a service agent. In addition, when the location of an appliance is moved, the controller sends a request for transmission of a new rule format to be added due to the movement to the service agent.

21 Claims, 8 Drawing Sheets

DEVICE DB

| DEVICE ID | DEVICE TYPE | DEVICE NAME | LOCATION | NODE ADDRESS | STATUS |
|---|---|---|---|---|---|
| AC-001 | AIR CONDITIONER | SANYO, SAP-S250 | LIVING ROOM 1 | AAAAAA | WARMING ON |
| AC-002 | AIR CONDITIONER | SANYO, SAP-M258 | CHILD ROOM 2 | BBBBBB | POWER OFF |
| AC-003 | AIR CONDITIONER | SANYO, SAP-S253 | BEDROOM 1 | CCCCCC | POWER OFF |
| SE-001 | HUMAN BODY SENSOR | SANYO, SSE-H251 | LIVING ROOM 1 | DDDDDD | ABSENCE |
| SE-002 | TEMPERATURE SENSOR | SANYO, SSE-H303 | LIVING ROOM 1 | EEEEEE | 13°C |
| ... | ... | ... | ... | ... | ... |

FIG. 4A SKELETON RULE DESCRIPTION RULE

FIG. 4B EXECUTION RULE DESCRIPTION RULE

FIG. 5A  EVENT (AT AN INITIAL TIME)

| EVENT TYPE | DEVICE ID | DEVICE TYPE | DEVICE NAME |
|---|---|---|---|

FIG. 5B  EVENT (DURING AN ORDINARY OPERATION)

| EVENT TYPE | DEVICE ID | STATUS TYPE | VALUE |
|---|---|---|---|

FIG. 5C  EVENT (AT A TIME OF SKELETON RULE TRANSMISSION)

| EVENT TYPE | DEVICE ID | PARAMETER (SKELETON RULE) |
|---|---|---|

FIG. 5D  ACTION (DURING AN ORDINARY OPERATION)

| ACTION TYPE | DEVICE ID | COMMAND | PARAMETER (VALUE) |
|---|---|---|---|

CONTROLLER, PROGRAM PRODUCT, AND STORAGE MEDIUM

BACKGROUND OF THE INVENTION

1. Field of the Invention

The present invention relates to a controller, a program product, and a storage medium, and more particularly to a controller, a program product, and a recording medium preferably used for controlling a plurality of home appliances in cooperation.

2. Description of the Related Art

In recent years, a so-called network household electrical system for controlling home appliances via an in-home network has been proposed and standardized. In this system, a controller such as a home server is connected to an in-home network. This controller transmits a control command to control an objective apparatus. Here, communication between the controller and the home appliances is performed using a communication protocol such as ECHO-NET, UPnP, or SCP. A power supply line for supplying power, a wireless communication network, or the like is used for a communication network. As an example of a structure of such a network household electrical system, for example, a network system described in JP 10-276478 A is known.

In such a network household appliance system, it is important how smoothly a control rule can be set with respect to the respective appliances present on the network. The system is targeted for general users, so that it should be simple to any user. In particular, for setting a control rule for controlling appliances, it is necessary that a complicated operation is minimized, and the control rule can be set with a simple operation.

Furthermore, in the future, it is expected that a new kind of appliance will be developed and commercialized, which has not been obtained conventionally, and connected to an in-home network. It is also necessary to configure a system so that the appliance can be controlled smoothly even in such a case.

Furthermore, depending upon the life scene such as setting of a plurality of air conditioners in the same room, those appliances may be preferably controlled in cooperation, compared with the previously assumed control. It is necessary to configure a system so as to smoothly control appliances in cooperation in accordance with the use form even in such a case.

SUMMARY OF THE INVENTION

It is an object of the present invention to enable a control rule to be set in a system smoothly and simply without requiring a complicated operation. It is another object to enable, even when a new kind of appliance that has not been obtained conventionally is connected to an in-home network, smooth control of the appliance. It is still another object to enable, even when a use form of an appliance that is not previously assumed is set in a network, appliances to be controlled in cooperation smoothly in accordance with the use form.

A first aspect of the present invention provides a controller for controlling an appliance connected to a network, characterized by including:

a rule format database for storing a rule format that is a description form of a control rule that can be set for the appliance;

control rule generation means for setting correspondence information in the rule format in accordance with input control information, and generating the control rule for controlling the appliance;

a control rule database for storing the control rule generated by the control rule generation means;

rule execution means for, when state data from the appliance connected to the network satisfies a condition of any one of the control rules stored in the control rule database, transmitting a control command in accordance with the control rule to an appliance to be controlled by the control rule; and rule format acquisition means for determining whether or not the rule format for the appliance connected to the network is stored in the rule format database, when the rule format in accordance with the appliance is not stored in the rule format database, sending a request for acquisition of the rule format for the appliance to an external network, and storing the rule format acquired from the external network in accordance with the request in the rule format database.

A second aspect of the present invention provides a controller for controlling an appliance connected to a network, characterized by including:

a rule format database for storing a format that is a description form of a control rule that can be set for the appliance;

control rule generation means for setting correspondence information in the rule format in/accordance with input control information, and generating the control rule for controlling the appliance;

a control rule database for storing the control rule generated by the control rule generation means;

rule execution means for, when state data from the appliance connected to the network satisfies a condition of any one of the control rules stored in the control rule database, transmitting a control command in accordance with the control rule to an appliance to be controlled by the control rule; and rule format acquisition means for, when information on a setting position of an appliance is newly registered with respect to the appliance, or when information on the setting position set with respect to the appliance is changed, sending a request for transmission of a new rule format to be added due to the change in the setting position to an external network, and storing the rule format acquired from the external network in accordance with the request in the rule format database.

A third aspect of the present invention provides a program product for imparting a function of controlling an appliance connected to a network to a memory or a computer in a controller, characterized by including:

a processing portion for configuring a rule format database for storing a format that is a description form of a control rule that can be set for the appliance;

a processing portion for setting correspondence information in the rule format in accordance with input control information, and generating the control rule for controlling the appliance;

a processing portion for configuring a control rule database for storing the control rule generated by operating the processing portion for generating the control rule;

a processing portion for, when state data from the appliance connected to the network satisfies a condition of any one of the control rules stored in the control rule database, transmitting a control command in accordance with the control rule to an appliance to be controlled by the control rule;

a processing portion for determining whether or not the rule format for the appliance connected to the network is stored in the rule format database, and when the rule format in accordance with the appliance is not stored in the rule format database, sending a request for acquisition of the rule format for the appliance to an external network; and a processing portion for storing the rule format obtained from the external network in accordance with the request for acquisition in the rule format database.

A fourth aspect of the present invention provides a program product for imparting a function of controlling an appliance connected to a network to a memory or a computer in a controller, characterized by including:

a processing portion for configuring a rule format database for storing a format that is a description form of a control rule that can be set for the appliance;

a processing portion for setting correspondence information in the rule format in accordance with input control information, and generating the control rule for controlling the appliance;

a processing portion for configuring a control rule database for storing the control rule generated by operating the processing portion for generating the control rule;

a processing portion for, when state data from the appliance connected to the network satisfies a condition of any one of the control rules stored in the control rule database, transmitting a control command in accordance with the control rule to an appliance to be controlled by the control rule;

a processing portion for, when information on a setting position of an appliance is newly registered with respect to the appliance, or when information on the setting position set with respect to the appliance is changed, sending a request for transmission of a new rule format to be added due to the change in the setting position to an external network; and a processing portion for storing the rule format acquired from the external network in accordance with the request for transmission in the rule format database.

A fifth aspect of the present invention provides a storage medium, which is characterized by storing the program product according to the third or fourth aspect.

According to these aspects of the present invention, only by appropriately setting correspondence information in a rule format, a control rule with respect to the appliance can be set in a system. This makes the operation in setting the control rule very simple.

Furthermore, in the case where a rule format corresponding to the appliance is not present in a rule format database, the corresponding rule format is appropriately acquired from an external network. Therefore, for example, in the case where a new kind of appliance is connected to a network, the appliance can be controlled smoothly.

Furthermore, in the case where the setting position of the appliance is changed, a new rule format to be added due to the change in the setting position is appropriately acquired from an external network. Therefore, even in the case where the appliance is used in an unusual, special use form such as setting a plurality of air conditioners in the same room, the appliance can be controlled smoothly in accordance with the use form.

BRIEF DESCRIPTION OF THE DRAWINGS

The above-mentioned and other objects and novel features of the present invention will be more apparent upon reading the following description of an embodiment with reference to the accompanying drawings in which.

DETAILED DESCRIPTION OF THE PREFERRED EMBODIMENTS

Hereinafter, the present invention will be described by way of an embodiment with reference to the drawings. The following embodiment is shown merely for an illustrative purpose, and does not particularly limit the scope of the present invention.

Figure 1:
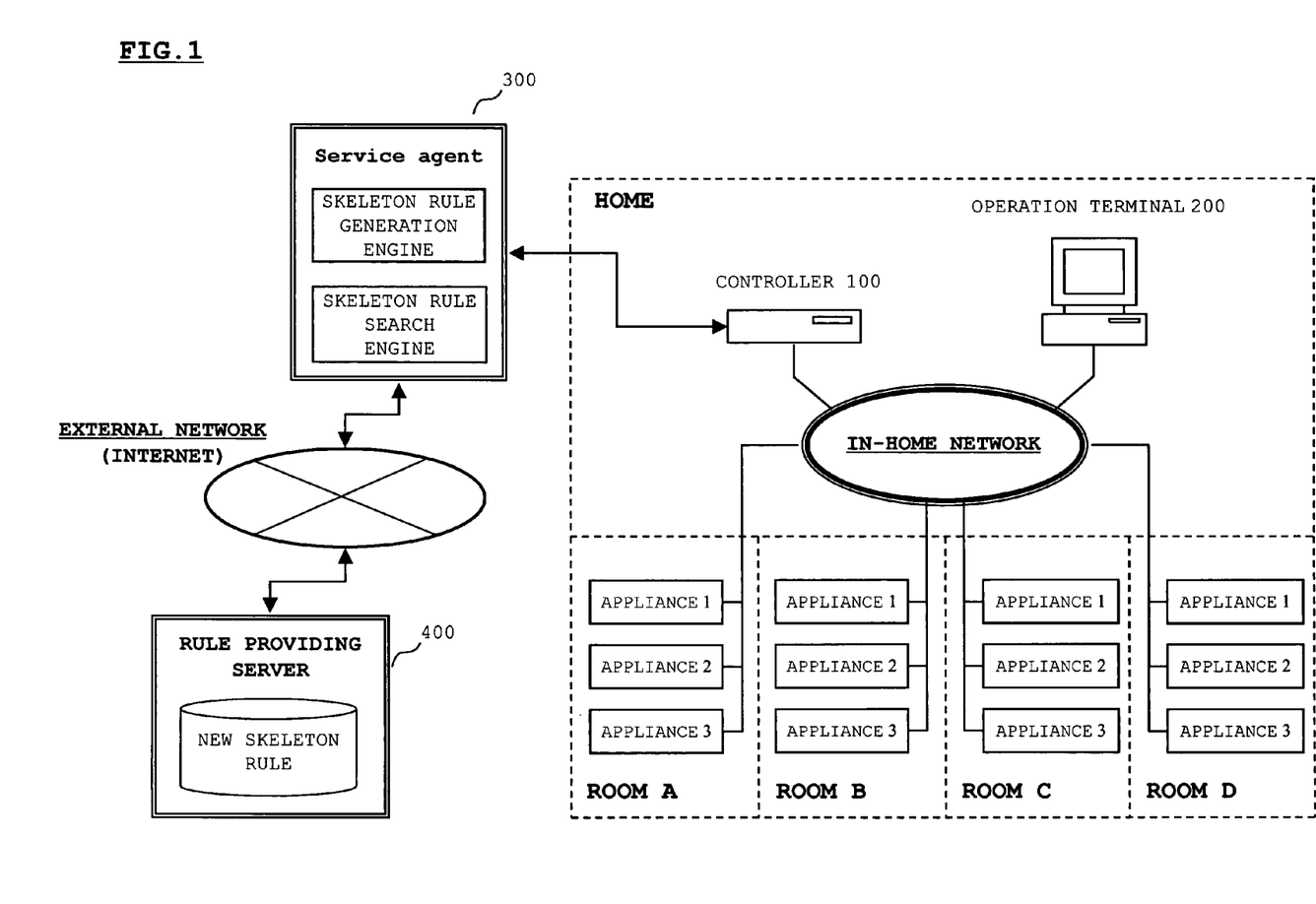
FIG. 1 shows a configuration of an appliance controlling system according to an embodiment of the present invention.

FIG. 1 shows an appliance controlling system according to this embodiment.

As shown in FIG. 1, in this embodiment, a controller 100, an operation terminal 200, and home appliances (appliances 1, 2, 3, . . . ) are connected via an in-home network. Herein, for the communication between the respective apparatuses, a communication protocol such as ECHONET, UpnP, or SCP is used in the same way as in the conventional example. Furthermore, a power supply line or a private wireless communication network is used as a communication network.

Herein, the controller 100 receives a state notification from each appliance, and transmits a control command to each appliance in accordance with a control rule (described later). Furthermore, the operation terminal 200 is used for setting a control rule with respect to the controller 100, inputting information on a setting position of each appliance, and the like. Some appliances store a skeleton rule (described later) for setting a control rule. Such a skeleton rule is transmitted to the controller 100 and stored, when the appliance is registered in an in-home network. The setting processing of the control rule using the skeleton rule will be described later.

The controller 100 can communicate with a service agent 300 provided outside the home. Herein, the service agent 300 is connected to an external network (e.g., the Internet), and includes a skeleton rule search engine for searching for a skeleton rule from a rule providing server 400 on the external network in accordance with a request from the controller 100. The service agent 300 further includes a skeleton rule generation engine for generating a skeleton rule in accordance with a request from the controller 100 and providing the skeleton rule to the controller 100. The processing of providing a skeleton rule from the service agent 300 to the controller 100 will be described later.

A database storing a skeleton rule may be provided in the service agent 300, in place of the skeleton rule generation engine. In this case, the skeleton rule is input, for example, by an administrator, and stored in the database. Then, the service agent 300 extracts a skeleton rule in accordance with a request from the controller 100 from the database, and provides it to the controller 100.

In the rule providing server 400, a skeleton rule corresponding to a new kind of appliance is accumulated. The rule providing server 400 is configured on the Internet, for example, by a producer that provides the new kind of appliance. More specifically, the producer generates a skeleton rule used in a new kind of appliance commercialized by the producer itself, and places it to the public on the rule providing server 400. Such a skeleton rule is searched for and obtained by the search engine of the service agent 300. The rule providing server 400 may be configured by a service agent other than a producer, instead of being configured by the producer.

Figure 2:
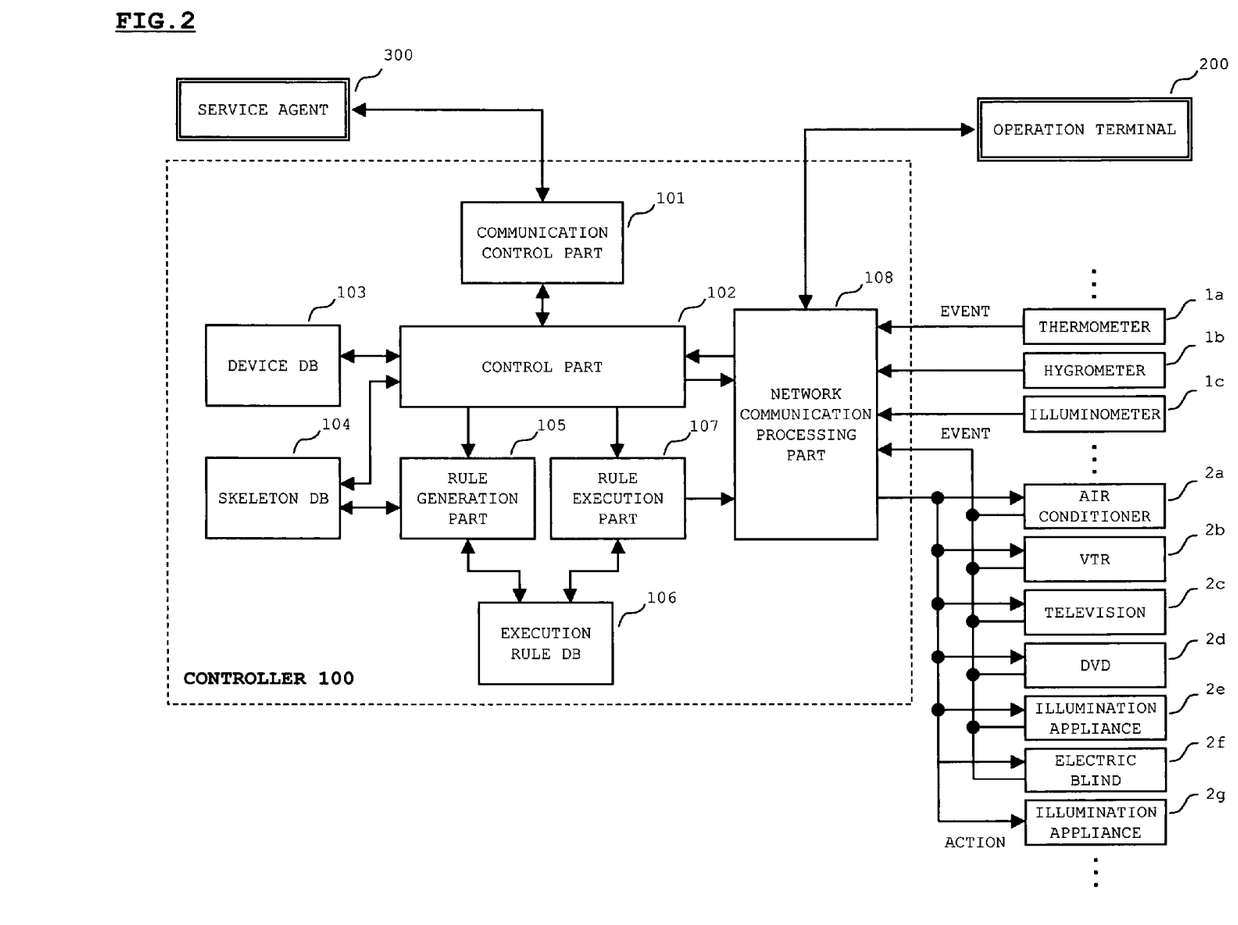
FIG. 2 shows a configuration of a controller according to the embodiment of the present invention.

FIG. 2 shows a functional block diagram of the controller 100 according to the embodiment.

Each function shown in FIG. 2 can be realized by mounting a CPU storing a program for executing each function, a memory for configuring various kinds of databases shown in FIG. 2, and the like in the controller 100 by hardware. Alternatively, each function can also be realized by downloading a program or a database for providing such a function to a CPU to a general-purpose personal computer or the like. Herein, a program or a database can be implemented by a method of downloading via a public network such as the Internet or a method of appropriately mounting a storage medium (disk, etc.) storing the program and database.

As shown in FIG. 2, the controller 100 is composed of a communication control part 101, a control part 102, a device DB (database) 103, a skeleton DB (database) 104, a rule generation part 105, an execution rule DB (database) 106, a rule execution part 107, and a network communication processing part 108.

The communication control part 101 controls processing of communicating with the service agent 300 via a public network. The control part 102 controls each part for executing the function as a controller. In the device DB 103, information on each appliance connected to the in-home network is accumulated. The information to be accumulated will be described later.

The skeleton DB 104 stores formats (skeleton rules) of control rules that can be set for the appliances under the condition that they are classified on the appliance type basis. The detail of the skeleton rule will be described later.

The rule generation part 105 sets corresponding data in the skeleton rule stored in the skeleton rule DB 104 in accordance with input information (setting information of the control rule) input from the operation terminal 200, and generates a control rule in accordance with the input information. Then, the rule generation part 105 stores the generated control rule in the execution rule DB 106. When a state notification (event) from an appliance matches with a control condition of any control rule stored in the execution rule DB 106, the rule execution part 107 generates a control command in accordance with the execution command of the control rule and transmits it to a corresponding appliance via the network communication processing part 108. The generation of a control rule and the generation of a control command using a skeleton rule will be described later.

The network communication processing part 108 performs communication with each appliance (appliances 1*a* to 1*c* . . . , appliances 2*a* to 2*g* . . . , operation terminal 200) on the in-home network in accordance with a communication protocol of the in-home network. More specifically, the network communication processing part 108 receives data (event) such as a state notification from those appliances, and transmits data (action) such as a control command to each appliance. Note that in the following description, the term "network" refers to an "in-home network" unless other specified.

Figure 3:
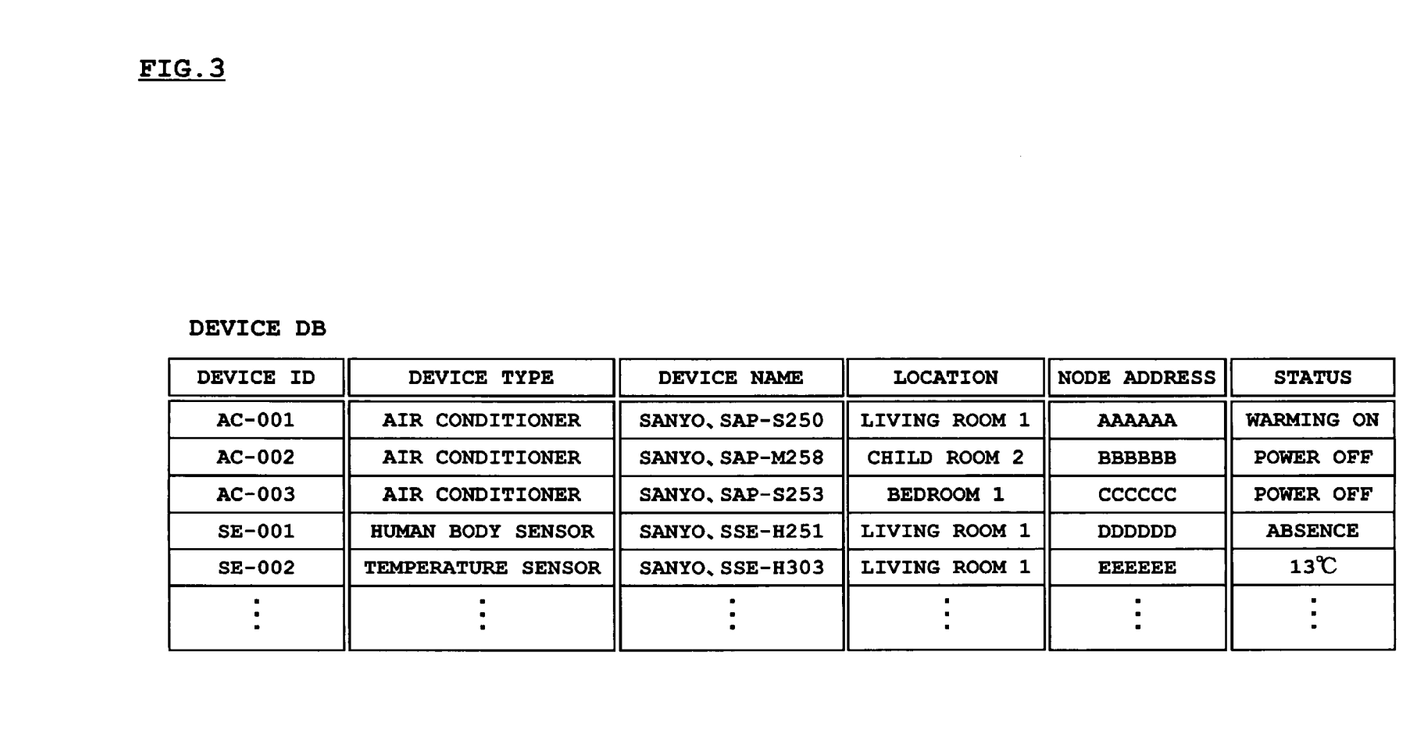
FIG. 3 shows a configuration of data stored in a device DB 103.

FIG. 3 shows a configuration of device information stored in the above-mentioned device DB 103.

As shown in FIG. 3, the device DB 103 is composed of a device ID for specifying the appliance, a device type for specifying the type (air conditioner, refrigerator, washing machine, etc.) of the appliance, a device name (producer, product number) of the appliance, a location showing a set place of the appliance, a node address showing an address of the appliance on the network, and a status storing a device state notified from the appliance.

Of those, the node address refers to address information for specifying a communication destination in a lower-level communication protocol on the network, which is an unused node address on the network provided by the controller 100 (control part 102) when the appliance is connected to the network and requests a node address. Furthermore, the device ID is provided by the controller 100, when the appliance is recognized as a network connecting appliance. When the appliance is connected to the network, the device type and device name are provided as an initial event to the controller 100 from the appliance. The status is provided as an event to the controller 100 from the appliance, when the appliance is registered in the controller 100 (device DB 103). Furthermore, the location is set to be input by a user via the operation terminal 200, when the appliance is registered in the controller 100 (device DB 103).

The node address may be provided to the appliance by another network control appliance (not shown) connected to the network or previously set in the appliance, instead of being provided to the appliance by the controller 100.

Figure 4A:
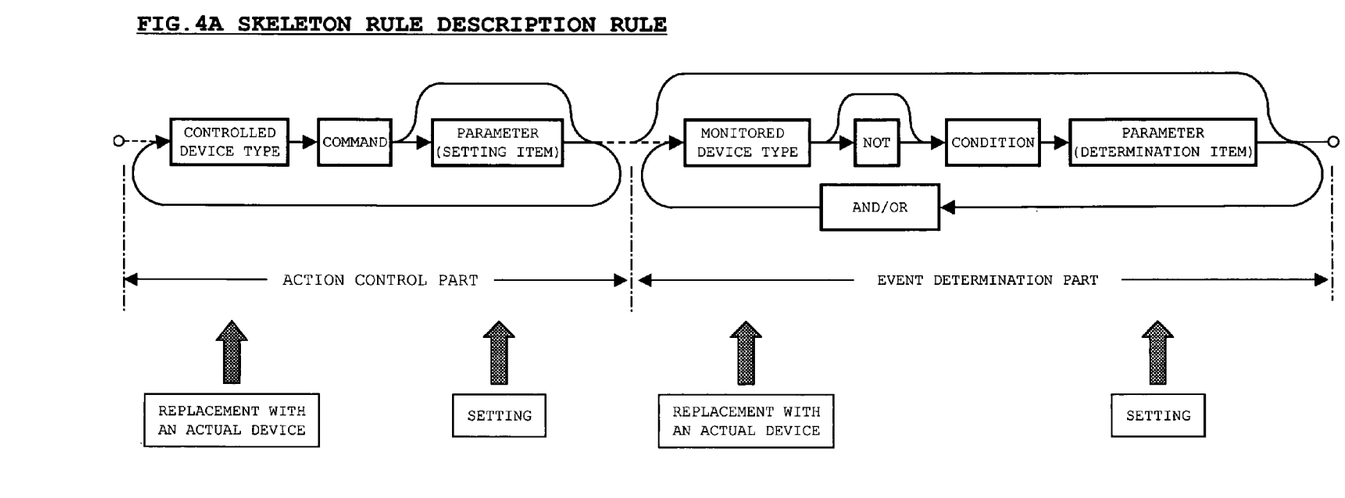
FIG. 4A is a diagram illustrating a description rule of a skeleton rule.
Figure 4B:
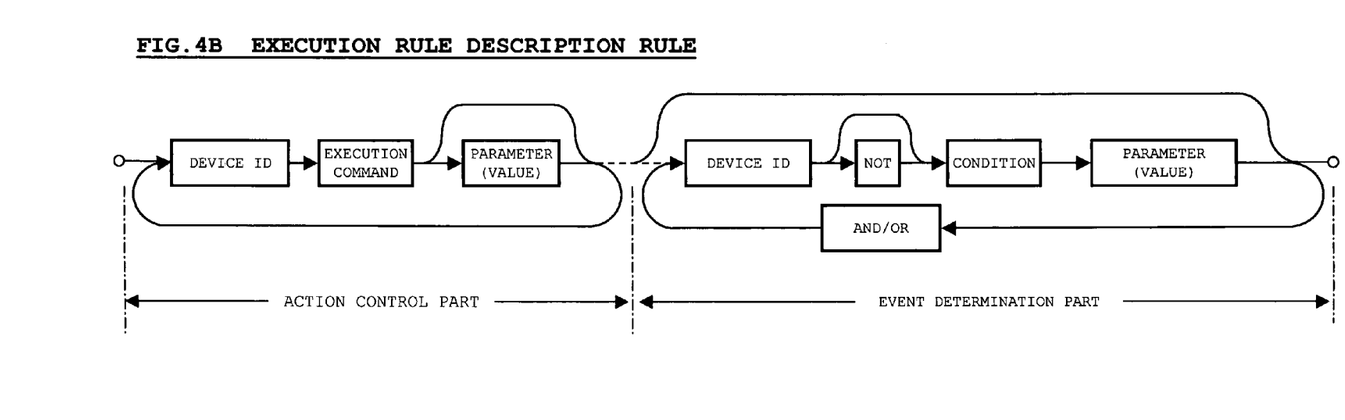
FIG. 4B is a diagram illustrating a description rule of an execution rule.

FIGS. 4A and 4B show a description rule of a skeleton rule and a description rule of an execution rule.

As shown in FIG. 4A, a rule format of a skeleton rule is divided into an action control part and an event determination part. Of those, the action control part defines the setting contents for an appliance to be controlled, and is composed of a "controlled device type", "command", and "parameter (setting item)".

Herein, the "controlled device type" defines a device type of an appliance to be controlled (see FIG. 3). The "command" defines the contents of a command with respect to an appliance to be controlled. For example, in the case of an air conditioner, the command corresponds to the switching of an operation mode, and the like. The "parameter (setting item)" defines a parameter that can be set by the "command". For example, in the case where the "command" is switching of an operation mode, the parameters are cooling/warming/dehumidification, etc. In the case where the contents of a control command with respect to an appliance to be controlled only with the "command" are specified, the "parameter (setting item)" is set to be NULL.

In the case where there are a plurality of appliances to be controlled, the action control part is described a plurality of times. This is represented by an arrow from the "parameter (setting item)" to the "controlled device type" shown in FIG. 4A.

Furthermore, out of the rule formats, the event determination part defines a state to be satisfied by an appliance to be monitored, and is composed of a "monitored device type", "negation condition (NOT)", "condition", and "parameter (determination item)". Herein, the "monitored device type" defines the device type (see FIG. 3) of an appliance to be monitored. The "condition" defines the contents of a condition to be satisfied by the appliance to be monitored. For example, in the case where the appliance to be monitored is a temperature sensor, the condition corresponds to a "target temperature or higher", etc. The parameter (setting item) "defines a parameter that can be set by the "condition". For example, when the "condition" is "target temperature or higher", the parameter corresponds to a target temperature. The "negation condition (NOT)" is a part provided in the case of negating the "condition".

"AND/OR" is provided when an AND condition or an OR condition to be satisfied by a plurality of appliances to be monitored is defined. There is also the case where an appliance to be controlled is merely controlled without monitoring of other appliances. This is represented by an arrow from the "parameter (setting item)" in the action control part to the latter stage of the "parameter (setting item)" in the event determination part shown in FIG. 4A.

The skeleton rule is generated previously for each device type to be controlled in accordance with the above-mentioned description rule and stored in the skeleton DB 104. For example, in the case of a skeleton rule for an air conditioner, the skeleton rule in which an air conditioner is described in the above-mentioned "controlled device type" is prepared by the number of variations taken by each part after the "command", and stored in the skeleton rule DB 104.

The control rule (execution rule) is generated by appropriately setting data in accordance with the contents of control in each part of the skeleton rule corresponding to the contents of control as shown in FIG. 4B. Herein, a device ID of an appliance to be controlled and a device ID of an appliance to be monitored are set respectively in the "controlled device type" and the "monitored devicetype". In the case where there is no appliance to be monitored, the event determination part is entirely made NULL.

Hereinafter, the processing during generation of a control rule (execution rule) will be described.

The rule generation part 105 refers to the device DB 103, and presents a list of appliances to be controlled to a user. Such presentation is performed, for example, by transmitting screen information (GUI) from the control part 102 to the operation terminal 200 via the network communication processing part 108. Even in the following processing, the presentation to the user is performed in the same way as in the above.

In such presentation, when a user selects an appliance to be controlled through a predetermined operation, the rule generation part 105 refers to the skeleton DB 104 and the device DB 103, and extracts a skeleton rule adaptable to the appliance to be controlled. Then, based on the device type, location, and status of the other appliances registered in the device DB 103, and the "monitored device type" of the extracted skeleton rule, a skeleton rule adaptable to the appliance to be controlled is specified as a candidate skeleton rule. At this time, the status of the appliance to be controlled is also considered. Furthermore, the number of the candidate skeleton rule is not necessarily one.

For example, in the case where an appliance to be controlled is an air condition set in a room, a skeleton rule in which an air conditioner is described in the "controlled device type" stored in the skeleton DB 104 is extracted. In the case where the room is a living room 1, when the device DB 103 (FIG. 3) is referred to, it is recognized that the air conditioner (AC-001) is being operated, and a human body sensor (SE-001) and a temperature sensor (SE-002) are set and being operated in the same room. First, a skeleton rule having no event determination part, which include a power OFF and operation mode setting as execution commands, is selected as a candidate skeleton rule from the current state of an air conditioner. Then, a skeleton rule including a human body sensor and a temperature sensor in the "monitored device type" in the event determination part is selected as a candidate skeleton rule from the presence/absence of an appliance to be monitored. Furthermore, in the case where the room is a bedroom 2 (not described in FIG. 3), when an air conditioner (e.g., AC-003) in the room is not being operated, and there is no appliance to be monitored in the room, a skeleton rule having no event determination part, in which a power ON and an operation mode are set, is selected as a candidate skeleton rule. In any case, in the case where the controller 100 has a clock function, a skeleton rule including a timer specification in the event determination part is selected as a candidate skeleton rule.

Then, a command that can be instructed to the appliance by the specified candidate is presented to a user as a command instruction candidate to the appliance, based on the description of the "command" of the action control part of the candidate skeleton rule, the event determination part, and the like.

When the user sets a command instruction through a predetermined operation with respect to the above-mentioned presentation, the rule generation part 105 extracts a skeleton rule for realizing the command instruction from a candidate skeleton rule, and presents parameter setting information for setting the value of a parameter (the action control part and the event determination part) of the extracted skeleton rule to the user. At this time, information on the selection of the "AND/OR", "negation condition (NOT)", or the like is also presented as parameter setting information to the event determination part.

Following to this, when the user sets a predetermined parameter, the rule generation part 105 obtains a parameter from the user, selects the "AND/OR", "negation condition (NOT)", or the like in the event determination part, and determines the configurations of the action control part and the event determination part of the execution rule. Then, the device ID with respect to the appliance to be controlled and the device ID of an appliance to be monitored are extracted from the device DB 103, and the extracted IDs are set in the "controlled device type" and the "monitored device type" of the skeleton rule thus extracted. Then, the parameter set by the user is set in the corresponding "parameter". At this point, the generation of the execution rule is completed. In the case where there is no event determination part, in the case where there is no "parameter" in the action control part, and the like, the setting procedure for the event determination part, the parameter, and the like is omitted.

The control rule (execution rule) thus generated is stored in the execution rule DB 106. Every time a state notification (event) is received from an appliance, the rule execution part 107 refers to the control rule, and determines whether or not the state notification (event) satisfies the condition of the event determination part.

FIGS. 5A to 5D show an exemplary configuration of data (event) transmitted from an appliance to the controller 100 and an exemplary configuration of data (action) transmitted from the controller 100 to an appliance.

Figure 5A:
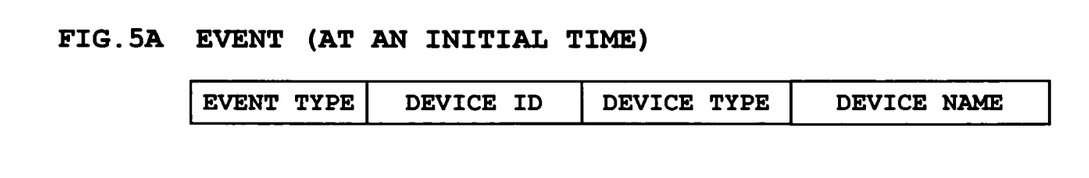
FIG. 5A shows a data configuration of an "event" transmitted from an appliance to a controller when the appliance is registered in a network.
Figure 5B:
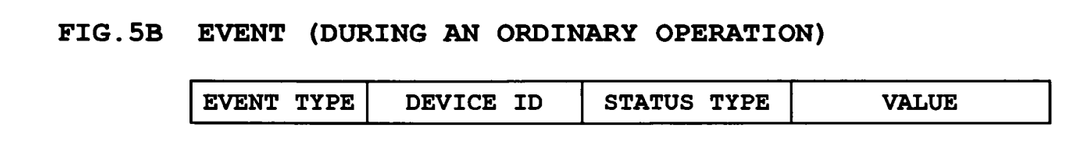
FIG. 5B shows a data configuration of an "event" transmitted from an appliance to a controller during an ordinary operation.
Figure 5C:
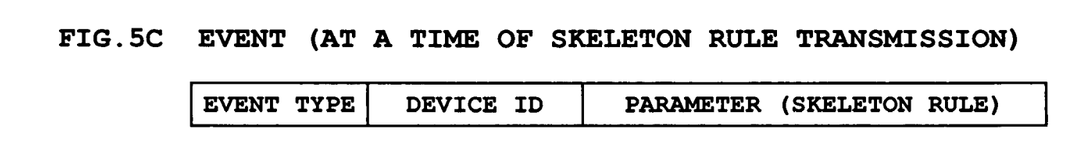
FIG. 5C shows a data configuration of an "event" transmitted from an appliance to a controller during transmission of a skeleton rule.
Figure 5D:
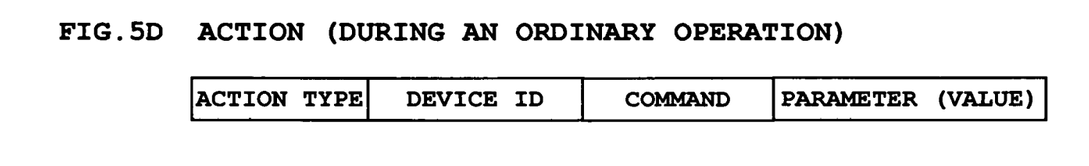
FIG. 5D shows a data configuration of an "action" transmitted from a controller to an appliance during an ordinary operation.

FIG. 5A shows a configuration of an event transmitted from an appliance when the appliance is registered on a network. FIG. 5B shows a configuration of an event transmitted from the appliance during an ordinary operation after the connection to the network. FIG. 5C shows a configuration of an event transmitted from an appliance when a skeleton rule is transmitted from the appliance to the controller 100 (described later). FIG. 5D shows a configuration of an action transmitted from the controller during an ordinary operation after the connection to the network.

In FIGS. 5A to 5D, an "event type" defines the type of a concerned event (network registration request/skeleton rule transmission/voluntary state notification/state notification with respect to an inquiry/etc.). An "action type" defines the type of a concerned action (network registration notification/ skeleton rule transmission request/control command transmission/request for transmission of a state notification/etc.). A "status type" defines a status segment to be subjected to a state notification, such as an "operation mode" or "temperature". A "value" defines the value of a state corresponding to a status type such as "warming" or "26° C.". A "device ID", "device type", "device name", "command", and "parameter" respectively correspond to data items described with reference to FIGS. 3 and 4.

In FIG. 5D, in the case where the "action type" is a "request for transmission of a state notification", the "command" and the "parameter" are set to be NULL.

Furthermore, the configurations of an event and an action to be transmitted/received between the controller 100 and the operation terminal 200 during generation of the above-mentioned control rule (execution rule) are not shown. In this case, the event and the action respectively include the "event type" and the "action type", and further, include information (device ID) for specifying a destination and a part for storing contents data to be transmitted/received. In addition, even in transmission/reception, etc. of location information, data is communicated with the same data configuration.

In FIGS. 5A to 5D, the types of an event and an action are identified by providing the "event type" and the "action type". However, in the case where the type of an event or an action can be identified based on other data items, the "event type" and the "action type" may be omitted.

Figure 6:
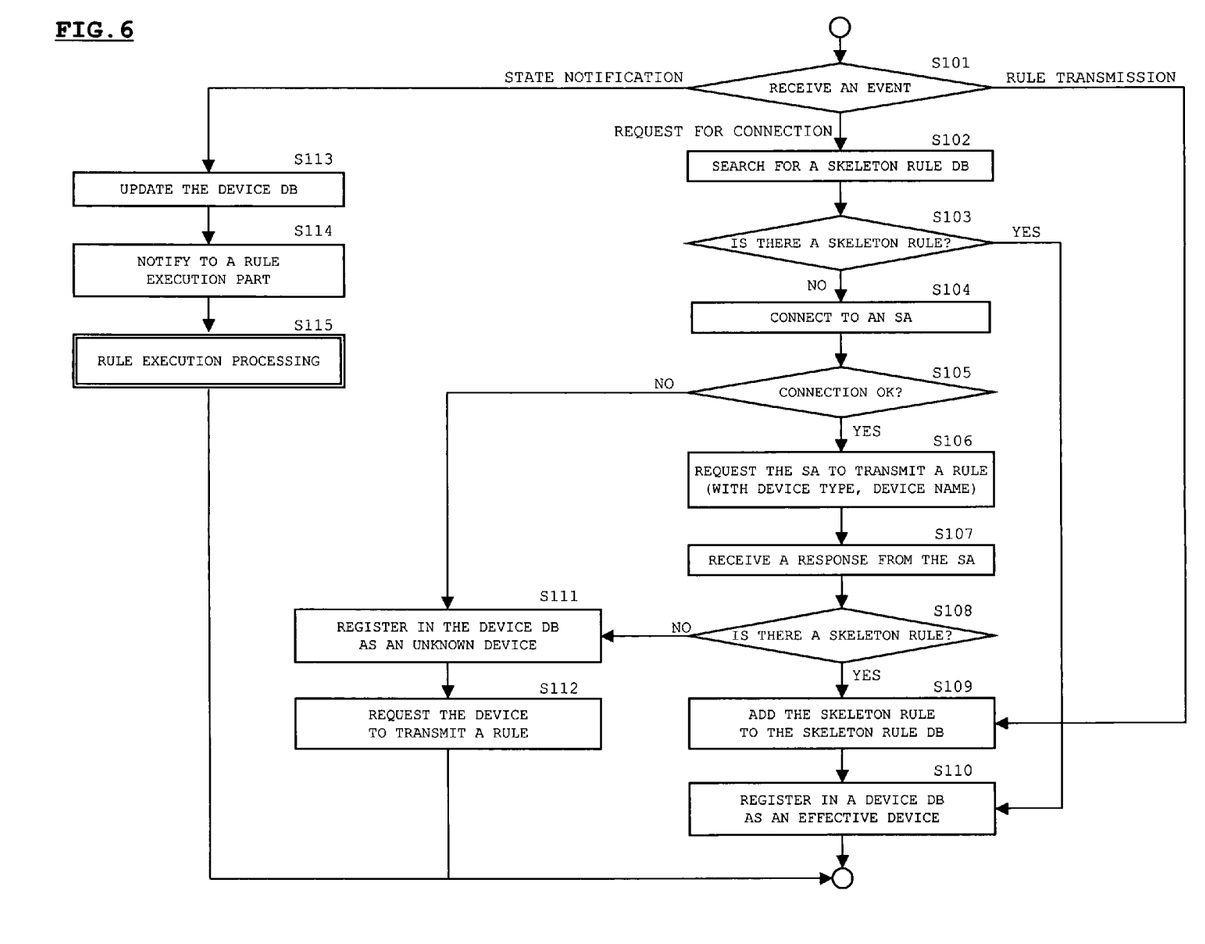
FIG. 6 is a processing flow executed during reception of an event.

FIG. 6 shows a flow of processing executed by the controller 100 during reception of an event. The processing flow during creation of the above-mentioned control rule (execution rule) is not shown.

Upon receiving an event from an appliance, the controller 100 (control part 102) determines the type of the received event (S101). Then, when the received event is a request for connection to the network (registration request), the skeleton DB 104 is searched based on the device type of the appliance included in the event shown in FIG. 5" (S102), and it is determined whether a skeleton rule corresponding to the device type has already been stored in the skeleton DB 104 (S103). Herein, when the corresponding skeleton rule is stored, the appliance is registered as an effective device in the device DB 103 (S110). On the other hand, when the corresponding skeleton rule is not stored, processing of obtaining the skeleton rule corresponding to the appliance is performed.

More specifically, the controller 100 performs connection processing with respect to the service agent 300 (S104), and when the controller 100 is connected to the service agent 300 (S105: YES), the controller 100 transmits a request for transmission of the skeleton rule corresponding to the appliance together with a device ID, a device type, and a device name of the appliance to the service agent 300 (S106).

Upon receiving the request for transmission, the service agent 300 searches for a skeleton rule file based on the received device type and device name. When the service agent 300 can find the corresponding skeleton rule file, the service agent 300 obtains it from the rule providing server 400, and transmits it together with a device ID, a device type, and a device name to the controller 100. On the other hand, when the service agent 300 cannot find the corresponding skeleton rule file, the service agent 300 transmits a notification to the effect that the corresponding skeleton rule file cannot be found together with a device ID, a device type, and a device name to the controller 100.

Upon the receiving a response from the service agent 300 (S107), the controller 100 determines whether or not a skeleton rule file is included in the received response (S108) When the skeleton rule file is included in the received response (S108: YES), the controller 100 adds the skeleton rule to the skeleton DB 104 (S109), and registers the appliance as an effective device in the device DB 103 (S110). On the other hand, when the skeleton rule file is not included in the received response (S108: NO), the controller 100 registers the appliance as an unknown device in the device DB 103 (S111), and transmits a request for transmission of a device rule to the appliance (S112).

Even in the case where the controller 100 cannot be connected to the service agent 300 in S105, the controller 100 performs the processing in S111 and S112.

In the case where the appliance stores a skeleton rule of its own, a skeleton rule is transmitted from the appliance to the controller 100 in response to a request for transmission in S112 (S101: Rule transmission). The controller 100 adds the skeleton rule thus received to the skeleton DB104 (S109), changes the appliance from an unknown device to an effective device, and registers it in the device DB103 (S110).

In the case where the event received from the appliance is a state notification (S101: state notification), the controller 100 changes the device DB 103 so as to reflect the received state of the appliance (S113). More specifically, the controller 100 stores a status type and a value of the event (see FIG. 5B) with respect to the status corresponding to the device ID of the event. At this time, when the same status type has already been stored, its value is changed. Furthermore, in the case where it is determined that a status type and a value which are unnecessary for the device ID are stored, the unnecessary status type and value may be deleted. The state of an appliance that transmits the event only needs to be reflected in the status appropriately.

Then, the device ID of the received event is transmitted to the rule execution part 107 (S114). Upon receiving the device ID, the rule execution part 107 performs rule execution processing (S115) More specifically, the rule execution part 107 determines whether or not an execution rule, in which the received device ID is an appliance to be monitored, is performed, while referring to the execution rule DB 106. In the case where an execution condition is satisfied, the rule execution part 107 transmits an action to the appliance to be controlled. In the case where the execution condition is not satisfied, the rule execution part 107 waits until the subsequent event is notified.

Figure 7:
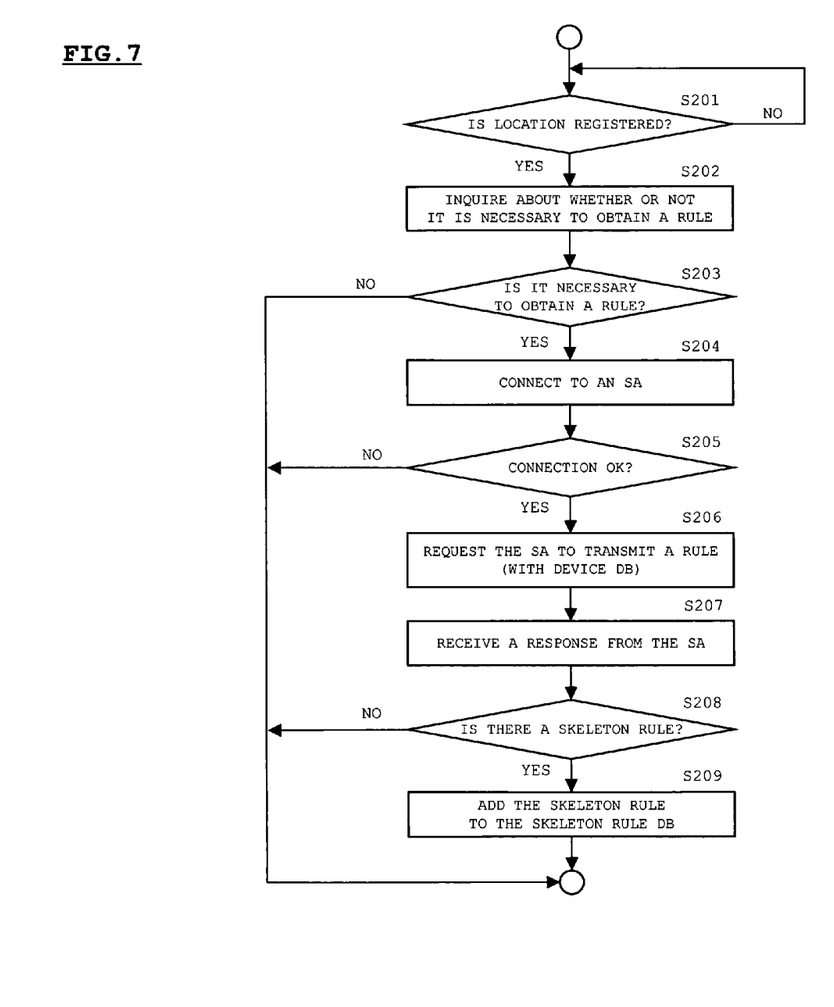
FIG. 7 is a processing flow executed when an appliance location is changed.

Next, the processing in the case where the set place (location) of an appliance is registered will be described with reference to FIG. 7. The case where a location is registered includes the case where the location of a new appliance is set upon registration of the appliance on the network, the case where the location of the appliance is changed as a result of moving the appliance, and the case where data on the appliance registered on the network is deleted.

When the location of an appliance is registered on the device DB 103 (S201), the controller 100 transmits data for inquiring of a user about whether or not it is necessary to obtain a skeleton rule to the operation terminal 200 (S202). When the user requests that the skeleton rule is obtained, the controller 100 performs connection processing to the service agent 300 (S204). When the controller 100 can be connected to the service agent 300 (S205: YES), the controller 100 transmits a request for transmission of a new skeleton rule to be added due to the registration of the location together with device information (location registration has been changed) stored in the device DB103, to the service agent 300 (S206). Note that the device information to be transmitted to the service agent 300 as information for generating the skeleton rule may include all the device information stored in the device DB103 or include only the information on the device placed at the location as a target of location registration. In the latter case, a location registration is also subject to the registration in the case where data on an appliance placed at the location is deleted. Further, the controller 100 may simultaneously transmits data representing which appliance's location has been changed. This makes it possible to specify a device to which the service agent 300 generates a skeleton rule. As a result, the service agent 300 can generate skeleton rules more efficiently. In addition, it is possible to avoid such a situation that the controller 100 receives the skeleton rule pre-stored in the skeleton DB104 again.

Upon receiving the data, the service agent 300 activates the skeleton rule generation engine, and generates a skeleton rule for giving an appliance corporation function to be newly added in accordance with the variation in the location. Alternatively, the service agent 300 extracts the skeleton rule to be added in accordance with the registration of the location from the database of its own. Then, the service agent 300 transmits the generated or extracted skeleton rule to the controller 100 that is a request origin. In the case where there is no skeleton rule to be newly added in accordance with the registration of the location, the service agent 300 transmits a notification to the effect that there is no skeleton rule to be newly added, to the controller 100.

Upon receiving a response from the service agent 300 (S207), the controller 100 determines whether or not the received response includes a skeleton rule (S208). When the skeleton rule is included in the received response (S208: YES), the controller 100 adds the skeleton rule to the skeleton DB 104 (S209). At this time, in the case where the skeleton rule concerned has been stored in the skeleton DB104, the addition to the skeleton DB104 is not performed.

As described above, according to this embodiment, a control rule (execution rule) can be set in the controller 100 by a simple operation.

Even in the case where there is no skeleton rule corresponding to the appliance in the skeleton DB 104, the corresponding skeleton rule can be obtained appropriately from the service agent 300 or the appliance. Therefore, for example, in the case where a new type of appliance is connected to a network, a control rule (execution rule) with respect to the appliance can be set smoothly.

Furthermore, in the case where the location of an appliance is registered, a new skeleton rule to be added by the registration of the location can be appropriately obtained from the service agent 300. For example, in the case where an appliance is used in a use form that is not previously assumed, such as setting of a plurality of air conditioners in the same room, the skeleton rule for controlling appliances in cooperation according to the use form is obtained from the service agent 300 as appropriate, so the control rule (execution rule) can be set smoothly in accordance with the use form.

It should be appreciated that the present invention is not limited to the above-mentioned embodiment, and can be variously modified.

Figure 8:
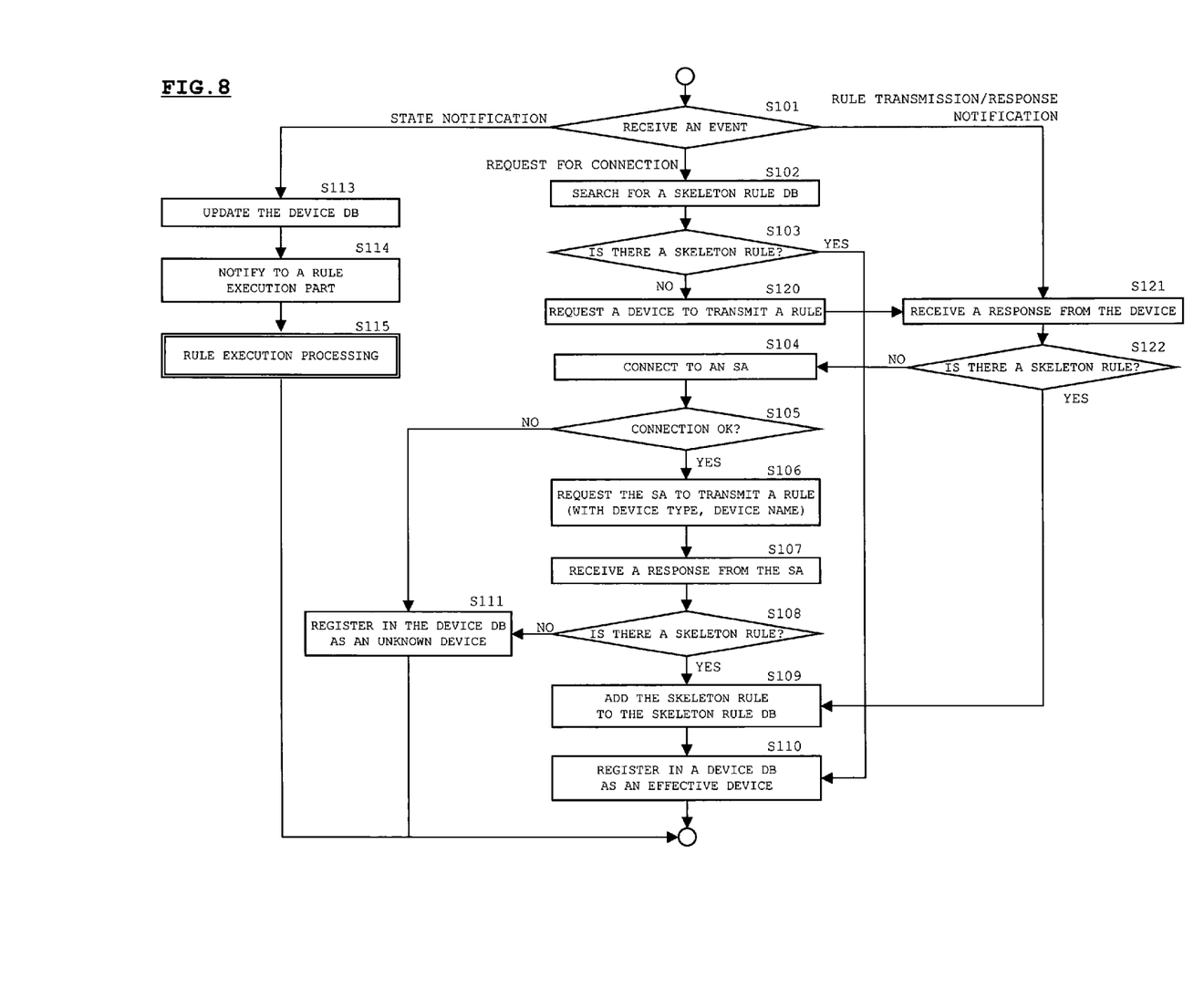
FIG. 8 is a modified example of a processing flow executed during reception of an event.

For example, in the above-mentioned embodiment, first, a request for transmission of a skeleton rule file is made with respect to the service agent 300, and in the case where the skeleton rule file cannot be obtained, a request for transmission of a skeleton rule is made with respect to the appliance. However, the following may also be performed. First, a request for transmission of a skeleton rule is made with respect to the appliance, and in the case where the skeleton rule cannot be obtained, a request for transmission of a skeleton rule file is made with respect to the service agent 300. FIG. 8 shows a processing flow in this case. More specifically, in S103, when it is determined that a skeleton rule corresponding to the skeleton DB 104 is not present, the controller 100 transmits a request for transmission of the skeleton rule to the appliance (S120). When the skeleton rule is included (S122: YES) in a response from the appliance with respect to the request (S121), the controller 100 adds the skeleton rule to the skeleton DB 104 (S109), and registers the appliance as an effective device in the device DB 103 (S110). On the other hand, if the skeleton rule is not included (S122: NO), the controller 100 performs connection processing with respect to the service agent 300 (S104). When the controller 100 can be connected to the service agent 300 (S105: YES), the controller 100 transmits a request for transmission of the skeleton rule corresponding to the appliance to the service agent 300 in the same manner as in the above (S106). If the controller 100 obtains the skeleton rule, the controller 100 adds the obtained skeleton rule to the skeleton DB 104 (S109), and registers the appliance as an effective device in the device DB 103 (S110). On the other hand, when the controller 100 cannot obtain the skeleton rule, the controller 100 registers the appliance as an unknown device in the device DB 103 (S111), and the registration processing of the appliance is completed.

In addition, the embodiment of the present invention can be appropriately modified variously within the scope of a technical idea defined by the claims.

What is claimed is:

1. A controller for controlling an appliance connected to a network, comprising:
   a rule format database for storing a rule format that is a description form of a control rule that can be set for the appliance;
   control rule generation means for setting correspondence information in the rule format in accordance with input control information, and generating the control rule for controlling the appliance;

a control rule database for storing the control rule generated by the control rule generation means;

rule execution means for, when state data from the appliance connected to the network satisfies a condition of any one of the control rules stored in the control rule database, transmitting a control command in accordance with the control rule to an appliance to be controlled by the control rule; and rule format acquisition means for determining whether or not the rule format for the appliance connected to the network is stored in the rule format database, when the rule format in accordance with the appliance is not stored in the rule format database, sending a request for acquisition of the rule format for the appliance to an external network, and storing the rule format acquired from the external network in accordance with the request in the rule format database.

2. A controller according to claim 1, wherein:
the rule format database stores the rule format while classifying the rule format based on an appliance type; and
the rule format acquisition means compares an appliance type of the appliance connected to the network with the rule format stored in the rule format database, and when a rule format corresponding to the appliance type is not stored in the rule format database, sends a request for acquisition of the rule format for the appliance to the external network.

3. A controller according to claim 1, wherein the rule format acquisition means sends a request for transmission of a rule format to the appliance, prior to sending of the request for acquisition of the rule format with respect to the external network or in a case where the rule format for the appliance cannot be acquired from the external network even when the request for acquisition with respect to the external network is made.

4. A controller according to any one of claims 1, 2, and 3, wherein, when information on a setting position of an appliance is newly registered with respect to the appliance, or when information on the setting position set with respect to the appliance is changed, the rule format acquisition means further sends a request for transmission of a new rule format to be added due to a change in the setting position to the external network.

5. The controller according to claim 4, wherein, upon sending the request for transmission of the rule format, the rule format acquisition means transmits at least appliance type information and setting position information of each appliance connected to the network to the external network, and causes the external network to transmit a rule format regarding new cooperation control among the appliances caused by the change in the setting position.

6. A controller for controlling an appliance connected to a network, comprising:
a rule format database for storing a format that is a description form of a control rule that can be set for the appliance;
control rule generation means for setting correspondence information in the rule format in accordance with input control information, and generating the control rule for controlling the appliance;
a control rule database for storing the control rule generated by the control rule generation means;
rule execution means for, when state data from the appliance connected to the network satisfies a condition of any one of the control rules stored in the control rule database, transmitting a control command in accordance with the control rule to an appliance to be controlled by the control rule; and rule format acquisition means for, when information on a setting position of an appliance is newly registered with respect to the appliance, or when information on the setting position set with respect to the appliance is changed, sending a request for transmission of a new rule format to be added due to the change in the setting position to an external network, and storing the rule format acquired from the external network in accordance with the request in the rule format database.

7. A controller according to claim 6, wherein, upon sending the request for transmission of the rule format, the rule format acquisition means transmits at least appliance type information and setting position information of each appliance connected to the network to the external network, and causes the external network to transmit a rule format regarding new cooperation control among the appliances caused by the change in the setting position.

8. A program product including a computer readable medium bearing a computer program for controlling an appliance connected to a network, the program comprising:
a processing portion for configuring a rule format database for storing a format that is a description form of a control rule that can be set for the appliance;
a processing portion for setting correspondence information in the rule format in accordance with input control information, and generating the control rule for controlling the appliance;
a processing portion for configuring a control rule database for storing the control rule generated by operating the processing portion for generating the control rule;
a processing portion for, when state data from the appliance connected to the network satisfies a condition of any one of the control rules stored in the control rule database, transmitting a control command in accordance with the control rule to an appliance to be controlled by the control rule;
a processing portion for determining whether or not the rule format for the appliance connected to the network is stored in the rule format database, and when the rule format in accordance with the appliance is not stored in the rule format database, sending a request for acquisition of the rule format for the appliance to an external network; and
a processing portion for storing the rule format obtained from the external network in accordance with the request for acquisition in the rule format database.

9. A program product according to claim 8, wherein:
the rule format database is configured to store the rule format while classifying the rule format based on an appliance type; and
the processing portion for sending a request for acquisition of the rule format to the external network compares an appliance type of the appliance connected to the network with the rule format stored in the rule format database, and when a rule format corresponding to the appliance type is not stored in the rule format database, sends a request for acquisition of the rule format for the appliance to the external network.

10. A program product according to claim 8, wherein the processing portion for sending a request for acquisition of the rule format to the external network includes a processing portion for sending a request for transmission of a rule format to the appliance, prior to sending of the request for acquisition of the rule format with respect to the external network or in a case where the rule format for the appliance cannot be obtained from the external network even when the request for acquisition with respect to the external network is made.

11. A program product according to any one of claims 8, 9, and 10, wherein the processing portion for sending a request for acquisition of the rule format to the external network further includes a processing portion for, when information on a setting position of an appliance is newly registered with respect to the appliance, or when information on the setting position set with respect to the appliance is changed, sending a request for transmission of a new rule format to be added due to a change in the setting position to the external network.

12. A program product according to claim 11, wherein the processing portion for transmitting a request for acquisition of the rule format to the external network includes a processing portion for, upon sending the request for transmission of the rule format, transmitting at least appliance type information and setting position information of each appliance connected to the network to the external network, and causing the external network to transmit a rule format regarding new cooperation control among the appliances caused by the change in the setting position.

13. A program product including a computer readable medium bearing a computer program for controlling an appliance connected to a network, the program comprising:
 a processing portion for configuring a rule format database for storing a format that is a description form of a control rule that can be set for the appliance;
 a processing portion for setting correspondence information in the rule format in accordance with input control information, and generating the control rule for controlling the appliance;
 a processing portion for configuring a control rule database for storing the control rule generated by operating the processing portion for generating the control rule;
 a processing portion for, when state data from the appliance connected to the network satisfies a condition of any one of the control rules stored in the control rule database, transmitting a control command in accordance with the control rule to an appliance to be controlled by the control rule;
 a processing portion for, when information on a setting position of an appliance is newly registered with respect to the appliance, or when information on the setting position set with respect to the appliance is changed, sending a request for transmission of a new rule format to be added due to the change in the setting position to an external network; and
 a processing portion for storing the rule format acquired from the external network in accordance with the request for transmission in the rule format database.

14. A program product according to claim 13, wherein the processing portion for sending a request for transmission of the rule format to the external network includes a processing portion for, upon sending the request for transmission of the rule format, transmitting at least appliance type information and setting position information of each appliance connected to the network to the external network, and causing the external network to transmit a rule format regarding new cooperation control among the appliances caused by the change in the setting position.

15. A computer readable storage medium, which stores a program for of controlling an appliance connected to a network, the program including:
 a processing portion for configuring a rule format database for storing a format that is a description form of a control rule that can be set for the appliance;
 a processing portion for setting correspondence information in the rule format in accordance with input control information, and generating the control rule for controlling the appliance;
 a processing portion for configuring a control rule database for storing the control rule generated by operating the processing portion for generating the control rule;
 a processing portion for, when state data from the appliance connected to the network satisfies a condition of any one of the control rules stored in the control rule database, transmitting a control command in accordance with the control rule to an appliance to be controlled by the control rule;
 a processing portion for determining whether or not the rule format for the appliance connected to the network is stored in the rule format database, and when the rule format in accordance with the appliance is not stored in the rule format database, sending a request for acquisition of the rule format for the appliance to an external network; and
 a processing portion for storing the rule format acquired from the external network in accordance with the request for acquisition in the rule format database.

16. A computer readable storage medium according to claim 15, wherein:
 the rule format database is configured to store the rule format while classifying the rule format based on an appliance type; and
 the processing portion for sending a request for acquisition of the rule format to the external network compares an appliance type of the appliance connected to the network with the rule format stored in the rule format database, and when a rule format corresponding to the appliance type is not stored in the rule format database, sends a request for acquisition of the rule format for the appliance to the external network.

17. A computer readable storage medium according to claim 15, wherein the processing portion for sending a request for acquisition of the rule format to the external network includes a processing portion for sending a request for transmission of a rule format to the appliance, prior to sending of the request for acquisition of the rule format with respect to the external network or in a case where the rule format for the appliance cannot be acquired from the external network even when the request for acquisition with respect to the external network is made.

18. A computer readable storage medium according to any one of claims 15, 16, and 17, wherein the processing portion for sending a request for acquisition of the rule format to the external network further includes a processing portion for, when information on a setting position of an appliance is newly registered with respect to the appliance, or when information on the setting position set with respect to the appliance is changed, sending a request for transmission of a new rule format to be added due to a change in the setting position to the external network.

19. A computer readable storage medium according to claim 18, wherein the processing portion for sending a request for acquisition of the rule format to the external network includes a processing portion for, upon sending the request for transmission of the rule format, transmitting at least appliance type information and setting position information of each appliance connected to the network to the external network, and causing the external network to transmit a rule format regarding new cooperation control among the appliances caused by the change in the setting position.

20. A computer readable storage medium, which stores a program for of controlling an appliance connected to a network, the program including:

a processing portion for configuring a rule format database for storing a format that is a description form of a control rule that can be set for the appliance;

a processing portion for setting correspondence information in the rule format in accordance with input control information, and generating the control rule for controlling the appliance;

a processing portion for configuring a control rule database for storing the control rule generated by operating the processing portion for generating the control rule;

a processing portion for, when state data from the appliance connected to the network satisfies a condition of any one of the control rules stored in the control rule database, transmitting a control command in accordance with the control rule to an appliance to be controlled by the control rule;

a processing portion for, when information on a setting position of an appliance is newly registered with respect to the appliance, or when information on the setting position set with respect to the appliance is changed, sending a request for transmission of a new rule format to be added due to the change in the setting position to an external network; and a processing portion for storing the rule format acquired from the external network in accordance with the request for transmission in the rule format database.

21. A computer readable storage medium according to claim 20, wherein the processing portion for sending a request for transmission of the rule format to the external network includes a processing portion for, upon sending the request for transmission of the rule format, transmitting at least appliance type information and setting position information of each appliance connected to the network to the external network, and causing the external network to transmit a rule format regarding new cooperation control among the appliances caused by the change in the setting position.

* * * * *